(12) United States Patent
Marchand et al.

(10) Patent No.: US 9,942,540 B2
(45) Date of Patent: Apr. 10, 2018

(54) METHOD AND A DEVICE FOR CREATING IMAGES

(71) Applicant: ORANGE, Paris (FR)

(72) Inventors: Herve Marchand, Vern sur Seiche (FR); Guillaume Roul, Noyal sur Vilaine (FR); Cedric Chedaleux, Rennes (FR)

(73) Assignee: ORANGE, Paris (FR)

( * ) Notice: Subject to any disclaimer, the term of this patent is extended or adjusted under 35 U.S.C. 154(b) by 99 days.

(21) Appl. No.: 14/387,782

(22) PCT Filed: Mar. 27, 2013

(86) PCT No.: PCT/FR2013/050661
§ 371 (c)(1),
(2) Date: Sep. 24, 2014

(87) PCT Pub. No.: WO2013/144506
PCT Pub. Date: Oct. 3, 2013

(65) Prior Publication Data
US 2015/0085086 A1    Mar. 26, 2015

(30) Foreign Application Priority Data
Mar. 29, 2012 (FR) ...................... 12 52868

(51) Int. Cl.
*H04N 13/04* (2006.01)
*G06T 15/20* (2011.01)
*H04N 13/02* (2006.01)

(52) U.S. Cl.
CPC .......... *H04N 13/0468* (2013.01); *G06T 15/20* (2013.01); *H04N 13/0275* (2013.01); *H04N 13/0285* (2013.01); *H04N 13/045* (2013.01); *H04N 13/0447* (2013.01); *H04N 13/0452* (2013.01)

(58) Field of Classification Search
CPC .......... H04N 13/0468; H04N 13/0275; H04N 13/0285; H04N 13/0447; G06T 15/20
See application file for complete search history.

(56) References Cited

U.S. PATENT DOCUMENTS

2009/0184981 A1* 7/2009 de Matos ........... H04N 5/44543
345/676
2010/0156907 A1* 6/2010 VanderSpek ............ G06T 15/20
345/427

OTHER PUBLICATIONS

International Preliminary Report on Patentability and English translation of the Written Opinion of the International Searching Authority dated Oct. 1, 2014 for corresponding International Application No. PCT/FR2013/050661, filed Mar. 27, 2013.

(Continued)

*Primary Examiner* — Nam Pham
(74) *Attorney, Agent, or Firm* — David D. Brush; Westman, Champlin & Koehler, P.A.

(57) ABSTRACT

A method is provided for creating at least one image of a graphics scene that is to be played back on a screen. The graphics scene is made up of graphics objects. The position of a user is known. A graphics object is created in at least one image while taking account of the position of the user. A terminal is provided, which includes including an image-creator for creating at least one image of a graphics scene that is to be played back on a screen of a user occupying a position relative to the screen, the scene including at least one graphics object.

5 Claims, 6 Drawing Sheets

(56) References Cited

OTHER PUBLICATIONS

Jiao et al., "Real Time Eye Detection and Tracking Under Various Light Conditions" Data Science Journal, vol. 6, pp. S636-S640, 2007.
International Search Report and Written Opinion dated May 15, 2013 for corresponding International Application No. PCT/FR2013/050661, filed Mar. 27, 2013.
Tanimoto M, "Free Viewpoint TV and Its International Standardization", Proceedings of the SPIE—The International Society for Optical Engineering SPIE—The International Society for Optical Engineering USA, vol. 7329, 2009, XP040496881.
Fehn C. et al., "Interactive 3-DTV-Concepts and Key Technologies" Proceedings of the IEEE, ISSS. New York, US, vol. 94, No. 3, Mar. 1, 2006 (Mar. 1, 2006) pp. 524-538, XP011370638.
French Search Report and Written Opinion dated Mar. 22, 2013 for corresponding French Application No. FR 1252868, filed Mar. 29, 2012.

\* cited by examiner

METHOD AND A DEVICE FOR CREATING IMAGES

CROSS-REFERENCE TO RELATED APPLICATIONS

This application is a Section 371 National Stage Application of International Application No. PCT/FR2013/050661, filed Mar. 27, 2013, the content of which is incorporated herein by reference in its entirety, and published as WO 2013/144506 on Oct. 3, 2013, not in English.

FIELD OF THE DISCLOSURE

The invention relates to creating images for playing back a graphics scene, in particular a scene that is made up of a plurality of graphics components and that is to be displayed on a screen.

More particularly, the invention applies to any terminal having a module suitable for receiving as input the description of a graphics scene and for playing back as output one or more images, also referred to as views, of that graphics scene. By way of example, such a terminal may be a computer, a TV set, a digital decoder, or indeed a mobile telephone.

BACKGROUND

The term "graphics scene" is used to mean a set of graphics objects displayed on a screen, often for the purpose of interacting with a user, e.g. in the context of a video game or of a man-machine interface. The term "graphics object" is used to mean a synthetic object, i.e. an object defined by a set of parameters (shape, color, texture, . . . ) as contrasted with an object referred to as a "natural" object.

The images of the scene are for playing back the image in relief on a screen, regardless of whether the screen is or is not a three-dimensional screen.

Two-dimensional screens are used for displaying data in two-dimensional mode: a single image is displayed on the screen which plays it back without relief, however the image may optionally include an impression of depth that can be thought of as relief.

Three-dimensional screens, in particular stereoscopic three-dimensional screens for computers or TV sets, are commonly used for viewing data in relief. Three-dimensional screens are generally capable of displaying images in two-dimensional mode or in three-dimensional mode. In three-dimensional mode, two images are displayed by the screen which thus plays them back in relief. The two so-called "stereoscopic" images are offset relative to each other, one being for the left eye and the other for the right eye of a user of the screen. This offset, which is also known as parallax, corresponds to the difference in horizontal distance between the two eyes of the human user. Depending on the value of this parallax, the user's brain imagines a point of convergence situated in front of or behind the plane of the screen, thus associating an impression of depth with the observed object.

Other systems, and in particular multiple view systems, also known as multi-view systems, generate more than two images of the screen, which images correspond to different views of objects for displaying in a plurality of directions. A plurality of images are then transmitted to a screen, referred to as a "multiscopic" screen, thereby enabling the scene to be viewed in relief at a plurality of different viewing angles. Depending on the user's position relative to the screen, the user can then benefit from two of the available images in order to construct a stereoscopic view of the image.

Usually, graphics scenes rely on a set of graphics software libraries (also known as "a graphics toolkit") that serve to draw the basic graphics components, e.g. cubes, polygons, buttons, lists, etc. Graphics libraries can communicate directly with the hardware of the terminal, in particular a video memory, a video card, and a graphics processor unit (GPU), or may make use of a graphics driver program (or application program interface (API)) in communication with the hardware.

Whatever the type of screen used, it is generally assumed that the user is located at a distance and in a position that are constant. Nevertheless, it is becoming more and more frequent that the user moves in front of the screen, in particular when the user is playing a game. This movement gives rise to drawbacks.

For example, in prior art solutions, the user cannot benefit from information about the hidden faces of the object (top, bottom, or sides of the object).

Furthermore, the inventors have found that those solutions generate stereoscopic images of quality that is poor since one of the images is not necessarily in register with the other. Specifically, prior art solutions assume that the user's head is held upright, and thus that the axis between the two eyes is parallel to the horizon line. If this is not true, then the user loses accuracy in stereoscopic viewing.

SUMMARY

To this end, in a functional aspect, the invention provides a method of creating at least one image of a graphics scene that is to be played back on a screen of a user occupying a position relative to the screen, the scene including at least one graphics object, the method being characterized in that at least one graphics object is created in at least one image while taking account of the position of the user.

Thus, the method of the invention provides the advantage of playing back a scene for display on the screen in which the scene is genuinely adapted to the user regardless of the user's position relative to the screen. In other words, if the user moves in any three-dimensional direction relative to the screen, which itself remains stationary, the playback of the graphics component in the image(s) created for the screen takes this movement into account. This approach is particularly advantageous when the user is playing a game, since under such circumstances users have a natural tendency to move in all directions.

In a particular implementation of the invention, a method as described above is also characterized in that the step of creating the graphics object comprises the steps of:
  creating a virtual universe having at least one virtual camera;
  positioning said at least one virtual camera as a function of the position of the user;
  projecting said at least one graphics object into the virtual universe; and
  capturing said at least one image by means of said at least one virtual camera on the basis of said projection into the virtual universe.

This implementation of the invention makes it possible to create a plurality of images automatically from a plurality of captures, or photographs, of the graphics scene, with each image or view being constituted by objects that have been projected while taking account of the user's position, and thus of the user's viewing angle. For example, in a stereoscopic context, two virtual cameras located respectively at the position of the user's left eye and at the position of the user's right eye are used for capturing two images, with one capture being for playing back on the screen the image that is for the right eye and with the other capture being for playing back the image for the left eye. In contrast, the prior art does not propose modifying the positions of the cameras in order to track the positions of the user's eyes, and as a result the scene is rendered without taking account of the movement of the user. With the invention, the user's viewing point is reproduced via the captured images. For example, if the user moves upwards, the invention enables the user to see the top of the object; if the user moves to the left, the right-hand side of the object is revealed to the user, etc.

Furthermore, the prior art does not provide any solution capable of compensating for the user's eyes not being in horizontal alignment. In the invention, even if the user's head is tilted, a high quality stereoscopic image is still played back to the user: unlike prior art systems, the user can see the top and the bottom of a plane surface since the images of that surface for the left eye and for the right eye are not in alignment.

In another implementation, which may be performed as an alternative or in addition, the image-creation method is characterized in that it further comprises:

a step of obtaining a number of views that can be displayed on the screen; and a step of creating images, in which the number of images created is a function of the number of views that can be played back by the screen.

This implementation has the advantage of automatically supplying the optimum number of images for the user's screen: starting from a given graphics scene (e.g. a game scene), the method of the invention automatically creates a single image if the user's screen is two-dimensional, two images when the screen is stereoscopic, and a greater number of images for a multiscopic screen.

This implementation is very advantageous since it provides a single method for a heterogeneous variety of display terminals.

In a hardware aspect, the invention provides a terminal including image-creation means for creating at least one image of a graphics scene that is to be played back on a screen of a user occupying a position relative to the screen, the scene including at least one graphics object; the terminal being characterized in that it includes means for creating at least one graphics object in at least one image while taking account of the position of the user.

In a particular embodiment of the invention, a terminal as described above further includes:

means for creating a virtual universe having at least one virtual camera;

means for positioning said at least one virtual camera as a function of the position of the user;

means for projecting said at least one graphics object into the virtual universe; and means for capturing said at least one image by means of at least one virtual camera on the basis of said projection into the virtual universe.

In another particular embodiment of the invention, which may be performed as an alternative to or in addition, a terminal as described above is further characterized in that it comprises:

means for obtaining a number of views that can be displayed on the screen;

image-creation means, the number thereof being a function of the number of views that can be played back on the screen.

In another hardware aspect, the invention also provides a computer program suitable for being performed on a terminal as described above, the program including code instructions that, when the program is executed by a processor, perform the steps of the above-defined method.

The invention can be better understood on reading the following description given by way of example and made with reference to the accompanying drawings.

THE FIGURES

DETAILED DESCRIPTION OF ILLUSTRATIVE EMBODIMENT

By way of illustration, the present invention is described with reference to a set-top box (STB) digital decoder connected to a TV set supporting a screen, however it may be applied to other devices such as a mobile telephone, a computer, a TV set, etc.

Figure 1:
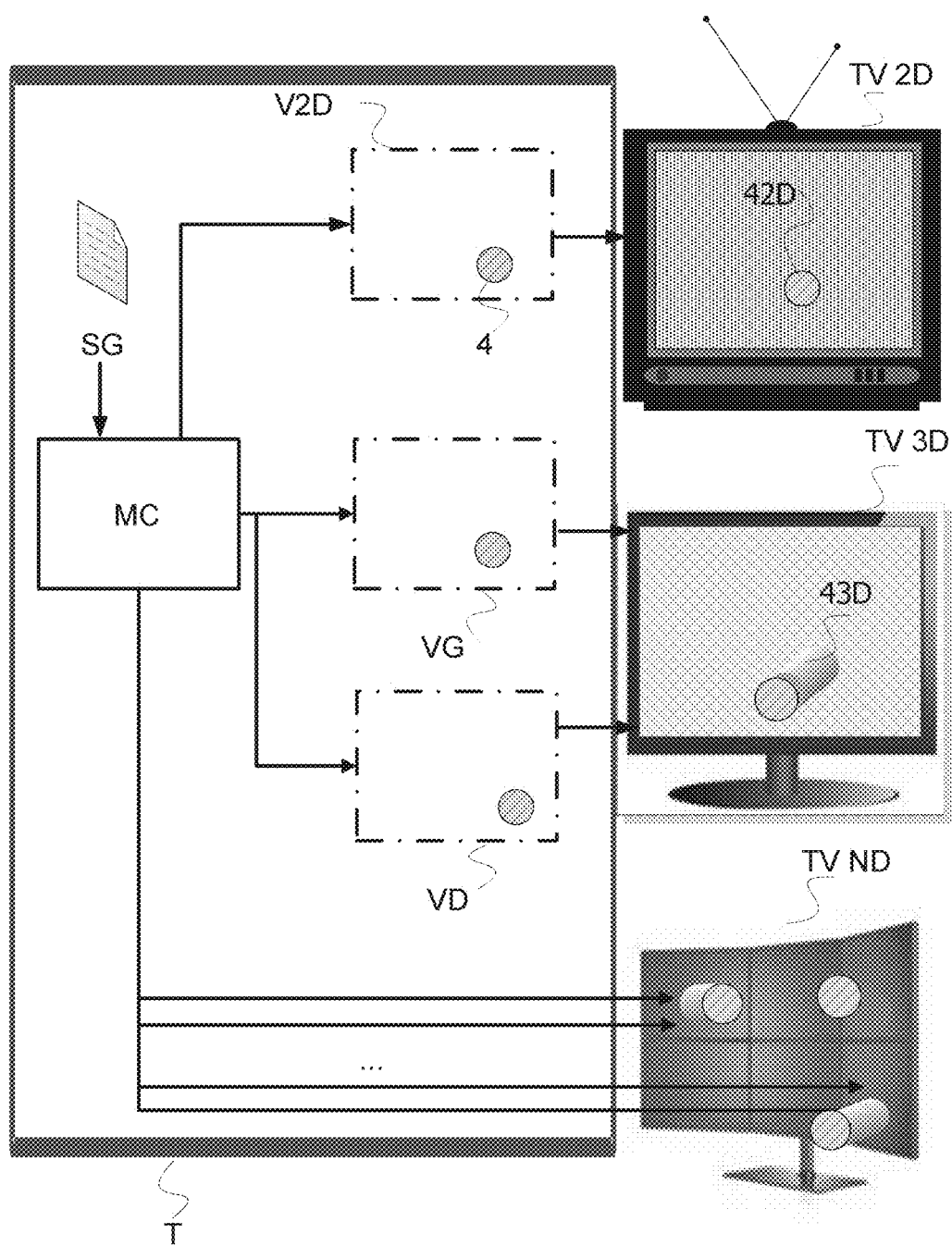
FIG. 1 shows a system comprising an image-creation module for playing back a graphics scene in an embodiment of the invention.

FIG. 1 shows a system including a terminal T of the invention fitted with a conversion module MC and connected by way of example to three TV screens TV 2D, TV 3D, and TV ND that respectively provide a two-dimensional display, a three-dimensional display, and a multi-view display. The terminal T contains a graphics scene SG which may for example be a man-machine interface or a game scene. The scene may have been developed locally or externally relative to the terminal. In this example, it is assumed that the graphics scene was developed externally to the terminal T and transmitted thereto via a telecommunications network (not shown). The conversion module MC of the terminal T receives the graphics scene as input in the form of a description (SG), e.g. a description of a two-dimensional graphics interface in which a cylinder 4 is drawn. The description may be in the form of a sequence of instructions suitable, on being executed, for creating in conventional manner a two-dimensional image V2D (for: view in two dimensions) of the graphics scene. The module MC creates two stereoscopic images VG and VD of the scene for the stereoscopic scene. The module MC can also create more than two images, e.g. six images, for the multiscopic screen.

In stereoscopic mode, one of the images (e.g. VG) corresponds to the view for the user's left eye, and the other image (VD) corresponds to the view for the user's right eye. A complete stereoscopic image made up of the pair of stereoscopic images VG and VD can be displayed in relief on the three-dimensional television TV 3D that has a three-dimensional screen, each element of the interface being rendered with a depth that is specific thereto: in this example, for a user of the screen TV 3D, the cylinder 43D has positive depth (it appears to project from the screen).

In the multiscopic situation, a plurality of optionally stereoscopic images are transmitted to the screen, which displays them for different viewing angles. A user perceives a different image (or a pair of different images for multi-view stereoscopy) depending on the user's position relative to the device. Consequently, it is possible for the user to move relative to the displayed objects in order to observe them from different directions.

In order to be able to create these various images for playing back on a screen, the terminal T has hardware and software architecture as described in detail below with reference to FIG. 2.

Figure 2:
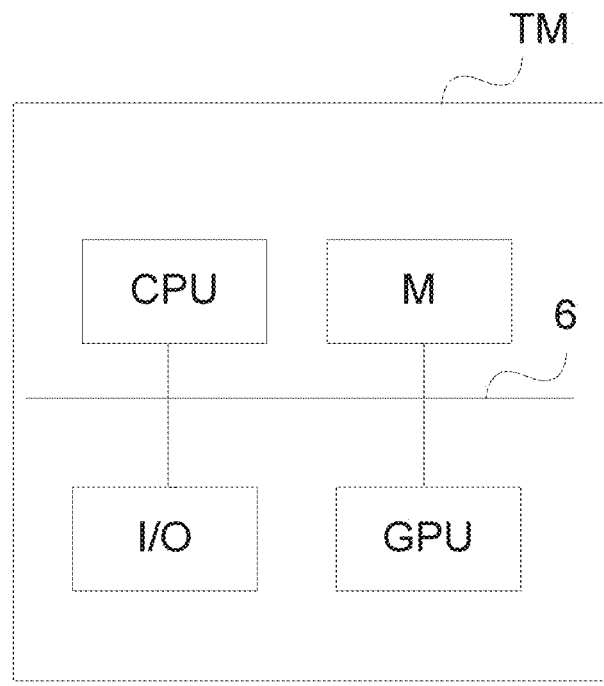
FIG. 2 is a block diagram of a terminal suitable for performing the steps of an image-creation method for playing back a graphics scene in an embodiment of the invention.

FIG. 2 is a highly diagrammatic view of an embodiment of one possible hardware architecture TM for the terminal T. The terminal includes a processor CPU for executing the various steps of the invention. The processor is connected: to a memory M storing at least the software programs (in a non-volatile portion of the memory known as read only memory (ROM)) and input data corresponding to the graphics scene; to a graphics processor GPU for taking charge of all or some of the graphics calculations that serve in particular to perform three-dimensional manipulation of the graphics components; and to input/output means I/O suitable for communicating externally, in particular for exchanging image data with a screen connected to the terminal, or with a communications network, in order to receive the characteristics of the screen to which it is connected and in order to receive data concerning the position of the user relative to the screen. For example, these input/output means comprise a high definition multimedia interface (HDMI) suitable for transferring non-compressed multimedia digital data (both audio and video) in high definition to the 2D, 3D, and MD TV sets. All of these elements are interconnected by a bus system 6.

The graphics images processed by the invention are stored in the memory M, and in this example they are executed on the CPU and the GPU of the terminal. The input graphics scene relies on a set of graphics software libraries TK (also known as a graphics toolkit) that make it possible to develop such scenes, e.g. man-machine interfaces or game scenes. In conventional manner, the graphics library TK relies on a low level graphics library also referred to as an application programming interface (API) that provides a set of libraries of functions dedicated to low level processing, e.g. audio and video processing (video card, sound card, etc.), or relating to input/output peripherals (joystick, network card, mouse, etc.). Such drivers, such as for example OpenGL (for open graphics library—a library based on a specification defining an interface for designing applications that create three-dimensional and two-dimensional images) are well known to the person skilled in the art. The graphics library TK acting as an overlay on the API graphics driver thus provides a development interface that is at a higher level and that is therefore more comfortable for developers of the graphics scene.

In an implementation of the invention, these various software layers are used to project the two-dimensional interface into a three-dimensional virtual universe by a projection method that is illustrated on the basis of the following figures. The term "virtual universe" is used to mean a virtual three-dimensional space into which graphics objects can be projected in order to obtain objects constituting a three-dimensional scene. This virtual universe has means for capturing projected components. These capture means are referred to below as "virtual cameras". Such a virtual camera is a software object that defines a point from which the three-dimensional scene is viewed, and that has the function of capturing the view in the virtual universe, and thus of simulating taking a picture of the view in a real universe.

In this example, all of software and hardware modules are incorporated in the conversion module MC of the terminal of FIG. 1. The terminal T may be a digital decoder or a mobile telephone provided with the above-mentioned elements, or indeed a connected television set incorporating these elements, etc.

The various steps of an implementation of the method of the invention are described below on the basis of FIG. 3.

During a first step E1 of initialization (INIT), a virtual universe is created. In conventional manner, this consists in positioning a virtual camera in a three-dimensional frame of reference. This step is described in greater detail below with reference to FIG. 4*a*.

A step E2 (GET_CP) corresponds to acquiring one of the basic graphics objects constituting the graphics scene (CP_2D), e.g. the cylinder 4. This element may be selected equally well from any of the graphics objects that are available.

Once one of the graphics objects has been acquired, the method then acts during a step E3 (PROJ) to project the image into the previously created three-dimensional universe. The projection step is described in detail below with reference to FIG. 7 and consists in cladding texture onto one or more polygons in order to obtain from the two-dimensional element a three-dimensional element that is constituted by one or more facets possessing the texture of the two-dimensional element.

During a step E4 (COMP), the method tests whether any graphics objects remain to be processed. If not, a new component is selected, and the projection step E3 is performed once more. If all of the components have been processed, the graphics scene as constituted in this way by all of the objects that have been projected into the virtual universe, is captured during a step E9 (CAPT) that consists in capturing or "photographing" the scene by means of the various cameras that have been created in a step E6 and positioned in a step E8, which steps are described below.

During a step E5, shown in parallel with the step E2 (which may take place before or after the step E2 or simultaneously therewith), the method of the invention obtains a number of views of the screen. In this example, the terminal is connected to the television set via an HDMI connection. HDMI defines a standard and an interface for digital audio/video, which standard makes it possible to connect an audio video source to a compatible device of the TV type. It is assumed that the two devices (terminal and TV set) also implement the optional consumer electronics control (CEC) standard that is associated with the HDMI standard, thereby enabling compatible devices to communicate with one another and to transmit commands. The terminal may then use the HDMI/CEC interface to retrieve the characteristics of the screen, and in particular the number of views that it can display (one, two, or six in the present example).

Figure 5A:
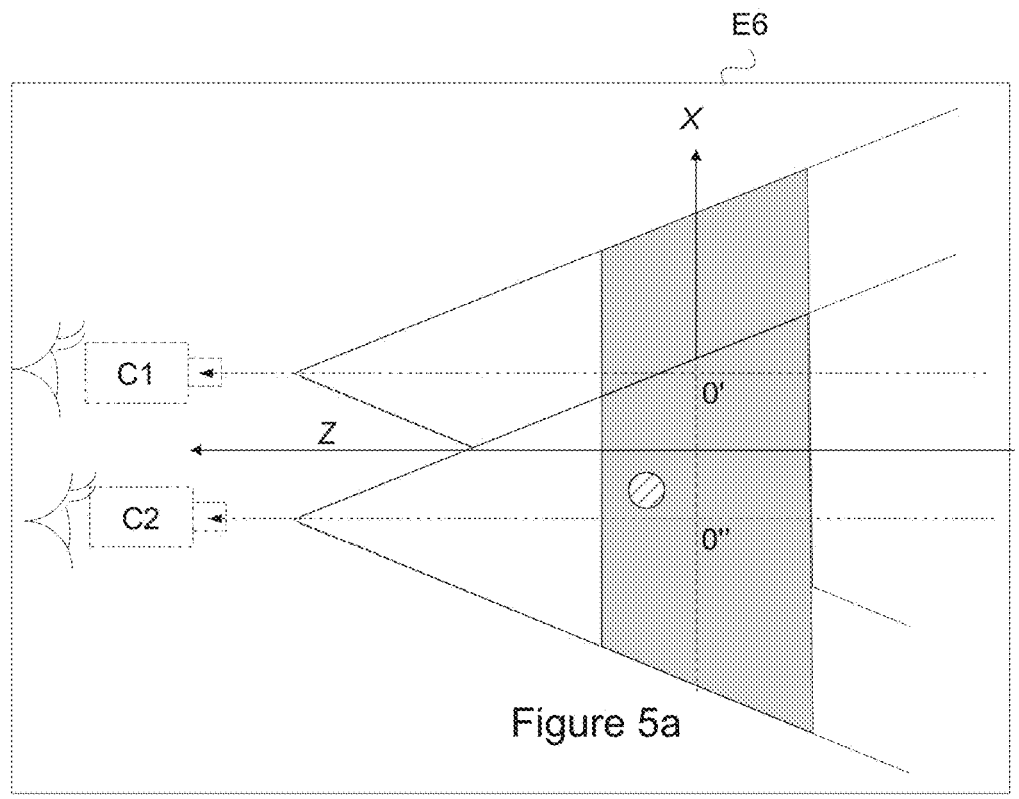
FIGS. 5a and 5b are graphical illustrations of camera-initialization steps of a method of the invention in the context of a stereoscopic screen.

During the step E6, the method creates a plurality of virtual cameras; the number of cameras depends on the number of views that the screen possesses: two for a stereoscopic screen; one for a non-stereoscopic screen; and six for the multiscopic screen in the example of FIG. 1 (and other configurations are possible, in particular for stereoscopic multiscopic screens that sometimes share images between the right or left eye of one view and the left or right eye of the following view. In this example, two virtual cameras C1 and C2 are created as shown in FIG. 5a, for a stereoscopic screen. Naturally, if the screen is two-dimensional, this step may be optimized since the single camera C1 created during the initialization stage E1 suffices.

The step E7 consists in retrieving the position of the user who is to receive the scene. Numerous techniques are known for obtaining the position of a user without requiring active participation on the part of that user, e.g. techniques for detecting and then tracking the user's head, or eyes, with the help of one or more cameras serving to determine the user's position in three-dimensional space relative to three axes. This position may be transmitted to the terminal by the camera(s) in charge of obtaining that position. This type of technique is described for example in the article "Real time eye detection and tracking under various light conditions" by Feng Jiao and Guiming He (Data Science Journal, Vol. 6 (2007), pp. S636-S640). That document is incorporated in the present application by reference.

The playback of the screen can thus be based on the exact position of each of the user's eyes, but alternatively it may also be based on the position of the user's head, face, shoulders, hands, etc. In a variant implementation, it is possible to imagine that the user personally transmits his or her position to the terminal (e.g. by pressing on a key of a remote control, which then transmits its position to the STB).

During a following step E8, once the terminal has the position of the user (as obtained in step E7) and the number of cameras (as it created in step E6), the position of each camera is established as a function of the user's position, as described with reference to FIG. 6a.

In step E9, the three-dimensional scene made up of various elements arranged in the universe of the cameras is made available as input. It may then be captured by the various cameras. For example, a first image IM1 of the three-dimensional scene is captured by the camera 1, C1, for the left eye. A second image IM2 is captured in the same manner for the right eye by replacing the camera 1, C1 by the camera 2, C2. The two images as obtained in this way form a pair of stereoscopic images.

At the end of this step E9, one or more images are available (e.g. the two stereoscopic images corresponding to the two cameras), which images are suitable for being combined during a step E10 (COMP) in order to create a complete image of the scene (IC) in the input format expected by the screen, e.g. two stereoscopic images that are side by side or one above the other (top/bottom), or indeed that alternate in time in compliance with the field sequential mode of the Blu-ray 3D format. This step E10 may be omitted if the screen is capable of accepting the images directly as input. In particular, it is omitted systematically when using a two-dimensional screen since only one image is delivered thereto, so it does not require any particular composition format.

The method comes to an end with a step E11 (END) during which the final image IC made up of all of the captured images is transmitted to the screen.

Figure 4A:
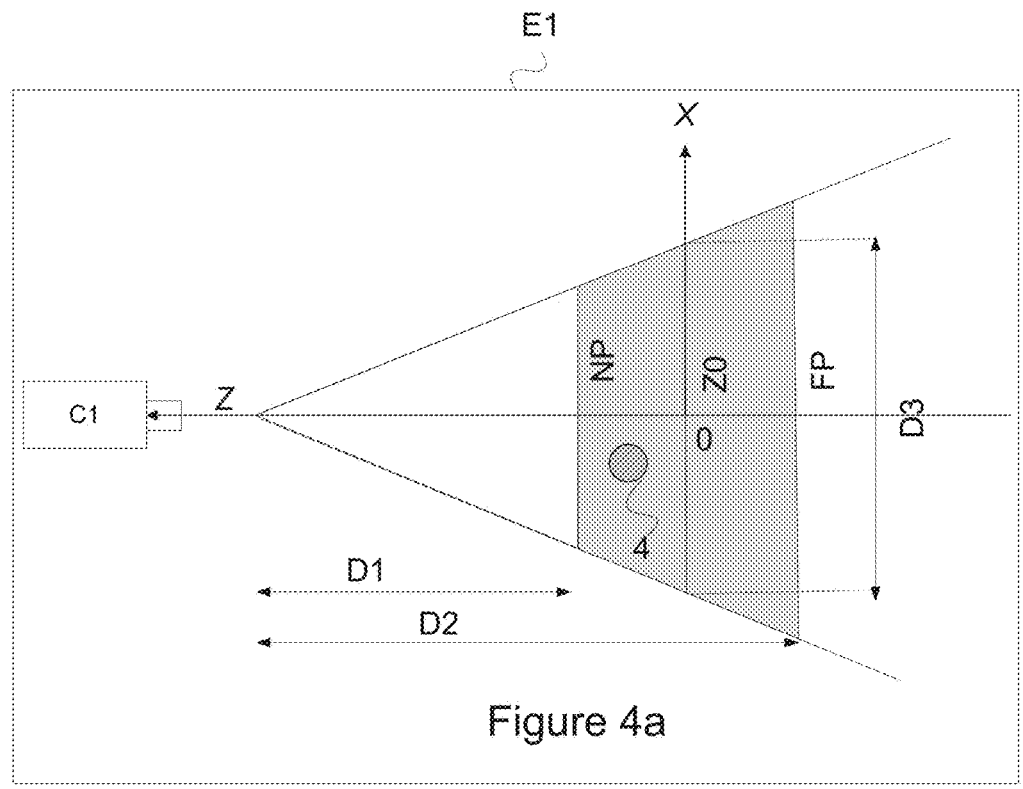
FIGS. 4a and 4b are graphical illustrations of the initialization step of a method of the invention.
Figure 4B:
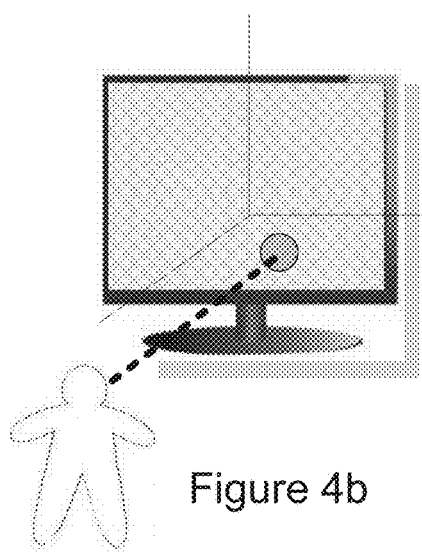

FIGS. 4a and 4b are graphical illustrations of the step (E1) of initializing a method of the invention.

The three-dimensional space represented by the reference frame (O, X, Y, Z) is initially created (with the axis Y not being shown since it extends perpendicularly to the plane of the figure, given that the virtual universe is being viewed from above). A first virtual camera C1 is created pointing to the origin of the reference frame. The configuration of the camera determines a volume of three-dimensional space that is also known as a frustum by the person skilled in the art, and which is potentially visible to the user when viewing the screen (the grayed area in the figure). It constitutes a truncated pyramid. The apex of the pyramid is the position of the camera C1, its base is the far plane FP, and the pyramid is truncated at the level of the near plane NP. All of three-dimensional objects that are to be found in the frustum, in this example the cylinder 4, are visible and are therefore rendered on the screen. The parameters of this space are freely settable. For example, it is possible to use a distance D1=150 centimeters (cm) between the apex of the pyramid and the plane NP, a distance D2=250 cm between the apex and the plane FP, and a distance D3 of 1280 cm for the height of the reference plane Z0 which corresponds to the zero-depth projection plane (Z=0). The unit selected in this example is the centimeter, however the distances could equally well be expressed in inches or in any other measurement unit, since the virtual universe that has been created is independent of any measurement unit and its settings may be freely chosen.

The user, shown facing the screen in FIG. 4b, which corresponds to FIG. 4a, sees the object 4 in its initial position, without relief. This is as though the user were in the position of the camera C1.

Figure 5B:
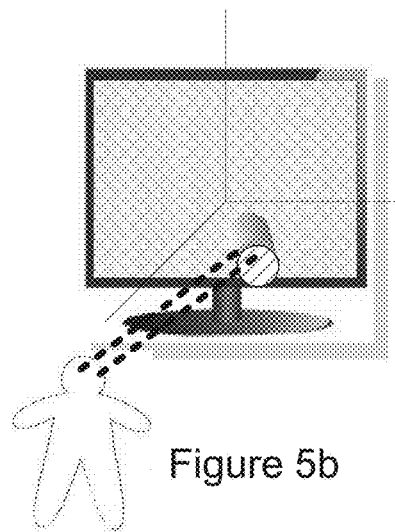

FIGS. 5a and 5b are graphical illustrations showing the camera creation step (E6) of a method of the invention in the context of a stereoscopic screen.

Figure 3:
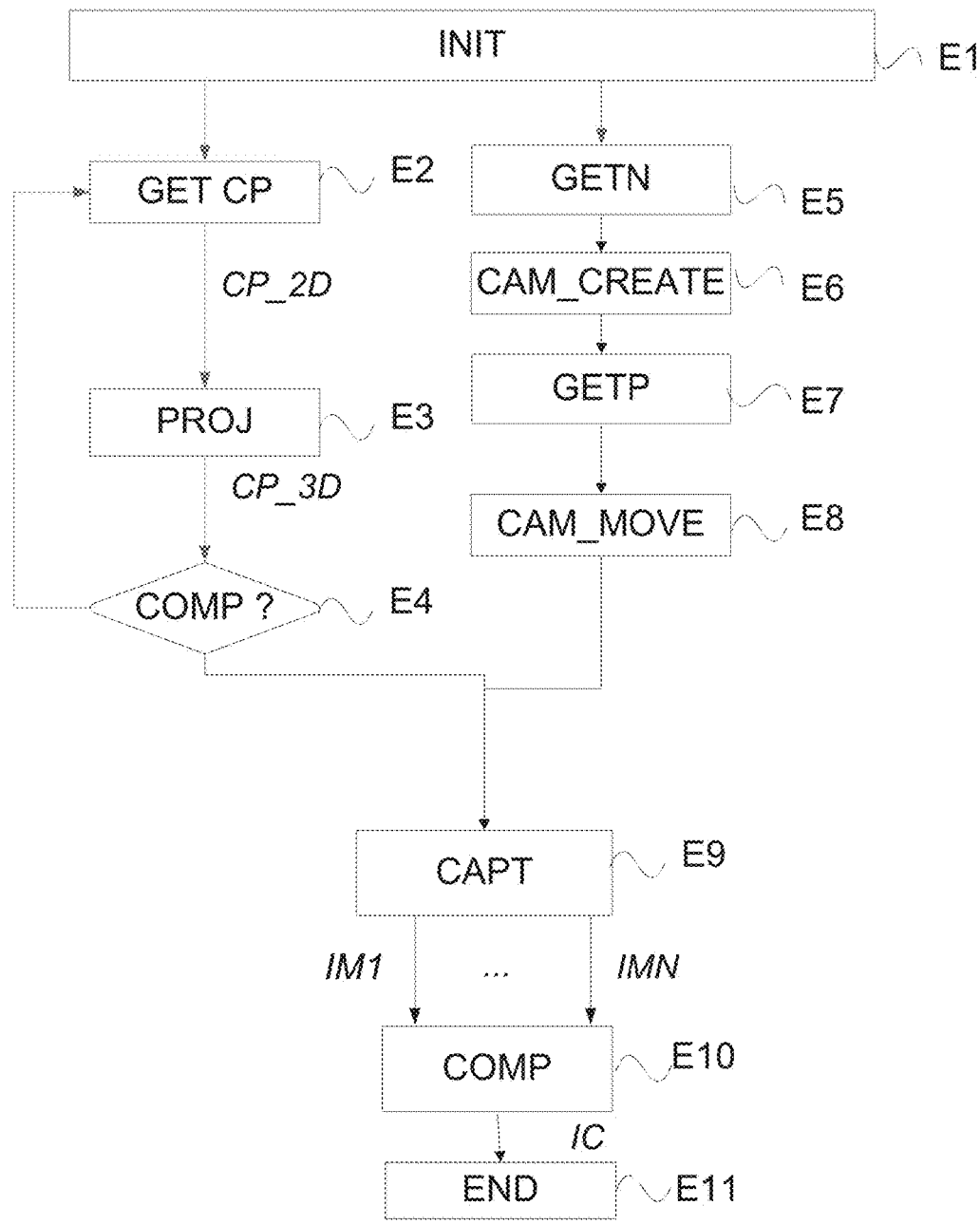
FIG. 3 is a high level flow chart showing the various steps of a method of the invention.

A second camera C2 is created that is identical to the first camera C1, during the step E6 shown in FIG. 3. The two cameras coincide, as do their frustums. Thereafter, the cameras C1 and C2 are spaced apart from each other along the Y axis and positioned at equal distances from the initial position, while complying with the stereoscopic rendering constraint, i.e. they are spaced apart by a parallax distance D4 corresponding to the space between the two eyes of a human observer, e.g. D4=6 cm. The origins O' and O" of the reference frames associated with the two cameras are shifted in translation by the same amount as the cameras, the camera C1 pointing at the origin of a reference frame (O', X, Y, Z) and the camera C2 at the origin of a reference frame (O", X, Y, Z) such that O' and O" are spaced apart by D4 along the Y axis. The three-dimensional universe is created in this way.

The user, still shown facing the middle of the screen in FIG. 4b, sees the objects 4 in its initial position, together with relief since the user is now receiving the views from the cameras C1 and C2 respectively via the right eye and the left eye.

Figure 6A:
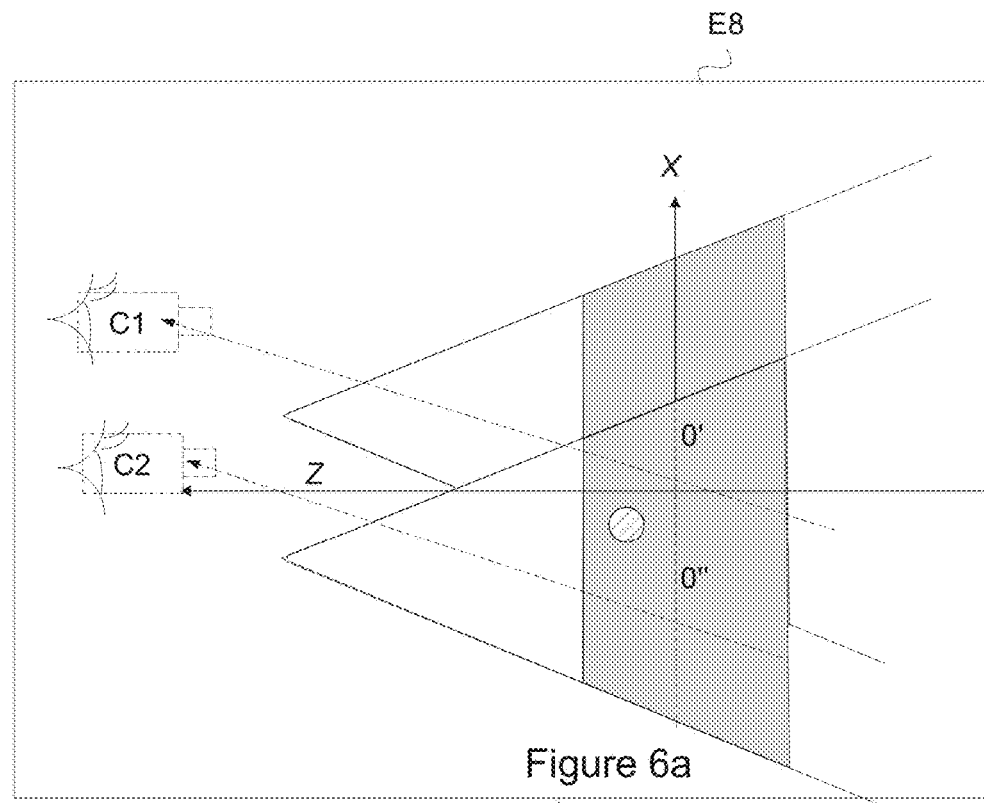
FIGS. 6a and 6b are graphical illustrations of playback steps of a method of the invention in the context of a stereoscopic screen.
Figure 6B:
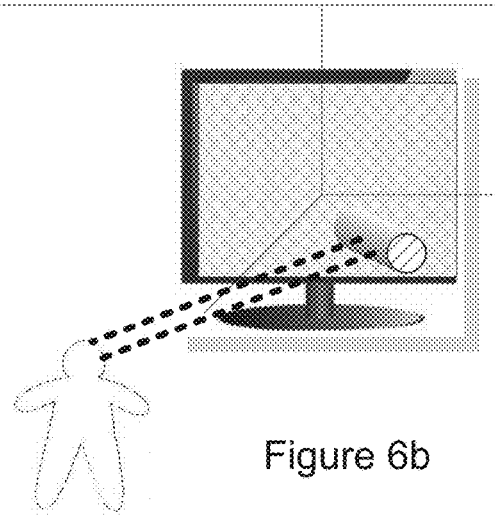

FIGS. 6a and 6b are graphical illustrations of the playback steps of a method of the invention in the context of a stereoscopic screen. It is assumed that the user has moved. In this step, the position P of the user relative to the screen is known as retrieved in step E7. In accordance with the invention, the cameras C1 and C2 are moved into a position P' in the virtual universe that corresponds to the user's position P in the real universe. More precisely, if it is desired to reproduce the positions of the user's eyes, the camera C1 is placed at the position of the user's left eye and the camera C2 at the position of the user's right eye.

As shown in FIG. 6b, the user in the real universe has moved to the left. The user can now see the right face of the object 4 as though the user were occupying the positions of the cameras C1 and C2.

Figure 7:
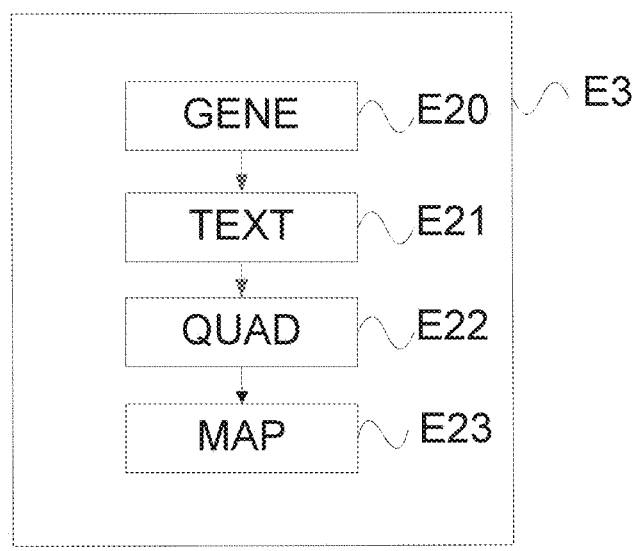
FIG. 7 is a detailed flow chart for projecting a graphics component of the scene.

FIG. 7 is a detailed flow chart corresponding to the step E3 of projecting a graphics component of the scene into the virtual universe. The projection step follows firstly the above-described step E2 of acquiring one of the components of the scene, and secondly the step E1 of creating the virtual three-dimensional universe. During the first step E20 (GENE), a graphics component (i.e. the cylinder 4) is made available as input, together with the three-dimensional virtual universe. During the step E20, a two-dimensional image is created from the acquired graphics component. For example, if the library TK provides as input a geometrical representation of the cylinder 4, this step serves to transform that representation into a set of pixels that can be considered as an image of the cylinder.

On the basis of this image, a texture of the component is extracted during a step E21 (TEXT). Such a texture extraction method is well known to the person skilled in the art and is not described in greater detail. In this implementation, the term "texture" is used to mean all of the pixels of the image constructed during the step E20 for the component under consideration and applicable on a polygon.

Thereafter, during a step E22 (QUAD), a surface is defined by a set of polygons suitable for representing the relief of the graphics component. By way of example, and in conventional manner, this surface may be a set of quadrangles or of triangles. In the description below, it is considered that the graphics component is represented by projection onto a single polygon, however representing the component on a genuine volume in perspective would require a plurality of polygons. The polygon is drawn in the position (Z=0) in the virtual universe, i.e. the component is given a zero depth by default.

Thereafter the texture is applied during a step E23 (MAP) on the polygon as drawn in this way, with the help of a texture cladding method. The cladding (or mapping) of a texture is a technique that is well known and that serves to draw a two-dimensional or three-dimensional object in such a manner that the polygons making it up are covered in the texture. It consists in associating each pixel of the polygon with a value extracted from the texture for cladding.

Naturally, the implementation as described above is given purely by way of non-limiting indication, and numerous modifications may easily be provided by the person skilled in the art without thereby going beyond the ambit of the invention.

The invention claimed is:

1. A non-transitory computer-readable medium comprising a computer program stored thereon and including code instructions that, when the program is executed by a processor, configure the computer to perform a method comprising:
    creating at least one image of a graphics scene that is to be played back on a screen of a user occupying a position relative to the screen, the scene including at least one graphics object to be projected on the screen according to mathematical rules of projection, wherein creating the at least one image comprises:
    obtaining the position of the user;
    creating the at least one graphics object to be projected in the at least one image of the graphics scene while taking account of the position of the user, which comprises:
        creating a virtual universe having at least one virtual camera;
        positioning said at least one virtual camera as a function of the position of the user;
        projecting said at least one graphics object into the virtual universe; and
        capturing said at least one image by using said at least one virtual camera on the basis of said projection into the virtual universe; and
    creating the at least one image of said graphics scene that is to be played back on the screen, the scene including at least said graphics object.

2. A method comprising:
    creating at least one image of a graphics scene that is to be played back on a screen of a user occupying a position relative to the screen, the scene including at least one graphics object, wherein creating the at least one image comprises:
    obtaining the position of the user;
    creating the at least one graphics object in the at least one image of the graphics scene while taking account of the position of the user, which comprises:
        creating a virtual universe having at least one virtual camera;
        positioning said at least one virtual camera as a function of the position of the user;
        projecting said at least one graphics object into the virtual universe; and
        capturing said at least one image by using said at least one virtual camera on the basis of said projection into the virtual universe; and
    creating the at least one image of said graphics scene that is to be played back on the screen, the scene including at least said graphics object.

3. The method according to claim 2, wherein the method further comprises:
    obtaining a number of views that can be displayed on the screen; and
    creating images, in which a number of images created is a function of a number of views that can be played back by the screen.

4. A terminal including:
    means for obtaining a position occupied by a user relative to a screen;
    means for creating at least one graphics object in at least one image of a graphics scene that is to be played back on the screen while taking account of the position of the user, which comprises:
        means for creating a virtual universe having at least one virtual camera;
        means for positioning said at least one virtual camera as a function of the position of the user;
        means for projecting said at least one graphics object into the virtual universe; and
        means for capturing said at least one image by means of the at least one virtual camera on the basis of said projection into the virtual universe; and
    image-creation means for creating the at least one image of said graphics scene that is to be played back on the screen, the scene including at least said graphics object.

5. The terminal according to claim 4, wherein the terminal comprises:
    means for obtaining a number of views that can be displayed on the screen;
    means for creating a number of images the number thereof being a function of a number of views that can be played back on the screen.

* * * * *